(12) United States Patent
Aki et al.

(10) Patent No.: US 6,438,074 B1
(45) Date of Patent: Aug. 20, 2002

(54) OPTICAL RECORDING MEDIUM MANUFACTURING MASTER RECORDING APPARATUS

(75) Inventors: Yuichi Aki; Takao Kondo, both of Tokyo; Masanobu Yamamoto, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/375,658

(22) Filed: Aug. 17, 1999

(30) Foreign Application Priority Data

Aug. 31, 1998 (JP) .......................... 10-245823

(51) Int. Cl.[7] ............... G11B 11/00; B32B 3/02
(52) U.S. Cl. ........................ 369/16; 428/64.3
(58) Field of Search .................. 369/16, 272, 280; 428/64.1, 64.4, 64.2, 64.3; 430/320, 321

(56) References Cited

FOREIGN PATENT DOCUMENTS

GB   1217960   1/1971

Primary Examiner—Tan Dinh

(74) Attorney, Agent, or Firm—Oblon, Spivak, McClelland, Maier & Neustadt, P.C.

(57) ABSTRACT

A master recording apparatus includes a revolving base (31) for revolving a substrate (1) coated with resist thereon, an irradiating mechanism (32), an elevator mechanism (33) for making the irradiating mechanism (32) capable of moving in a vertical direction and in a surface direction which is perpendicular to the vertical direction relative to the revolving base (31) and a height position displacement mechanism (35) interposing between the irradiating mechanism (32) and the elevator mechanism (33), and in which the irradiating mechanism (32) is connected with the elevator mechanism (33) through the height position displacement mechanism (35) and the irradiating mechanism (32) has such a structure in which at least a converging lens system (36) and a displacement driving mechanism (37) for adjusting a focus are supported by a gas static pressure pad housing (38), in the gas static pressure pad housing (38) a gas feeding pad (39) is disposed facing a bottom surface opposing the substrate and gas is made to be fed between the irradiating mechanism (32) and the said substrate (1) through the gas feeding pad (39), whereby the contact between the substrate and the irradiating mechanism is avoided at a time of carrying out a recording of a predetermined pattern by irradiating a beam.

2 Claims, 4 Drawing Sheets

OPTICAL RECORDING MEDIUM MANUFACTURING MASTER RECORDING APPARATUS

BACKGROUND OF THE INVENTION

1. Field of the Invention

The present invention relates to an optical recording medium manufacturing master recording apparatus which condenses and irradiates a beam on a resist to thereby form a desired recording pattern.

2. Description of the Related Art

As optical recording media for recording audio, video and other various kinds of information, there is an optical recording medium of a ROM (Read Only Memory,) type, a write-once type, a rewritable type and the like such as an optical disc, an optical card, a magneto-optical disc, a phase change optical recording medium disc in which recording or reproduction thereof is performed by a light irradiation and the like, and for example, in a ROM type like a compact disc, minute convexes and concaves such as phase pits, pregrooves and the like for recording data information, a tracking servo signal and the like are formed or in the optical recording media such as the write-once type, the rewritable type and the like, the minute convexes and concaves such as the pregrooves and the like are formed.

When a substrate of the optical recording medium on which the minute convexes and concaves are formed is manufactured, it is manufactured by a stamper having a surface with convexes and concaves corresponding to the convexes and the concaves in compression molding, injection molding or the like. The stamper is duplicated by giving metal plating on a master for an optical recording medium and then peeling it off.

In the following one example of a process for manufacturing the master for the optical recording medium will be explained. In this example, an explanation will be made of a case where a predetermined pattern is formed by carrying out irradiation of a light particularly on a photoresist.

As is shown in FIG. 1, for example, a glass substrate 10 whose surface is adequately smoothly ground is mounted on a rotating base (not shown graphically), and a photoresist 11 which is soluble in alkalis is uniformly coated thereon as thick as, for example, about 0.1 $\mu$m, as FIG. 2 shows, in a state that the substrate is revolved at a predetermined rotation speed.

The photoresist 11 is, as shown in FIG. 3, exposed to a predetermined pattern by a laser beam L. The exposure is carried out by feeding the laser beam L by an equal distance per one revolution in a radius direction of the glass substrate 10 while revolving the glass substrate 10 to generate a latent image of a groove on the resist 11 at a constant interval in a spiral state or a concentric circle state.

Next, as is shown in FIG. 4, the glass substrate 10 is developed in an alkaline developing solution and then, the exposed portion is removed. Being done in this manner, a master 20 for an optical recording medium, on which a predetermined pattern 11a with the minute convexes and concaves is formed is obtained on the glass substrate 10.

A schematic arrangement of an optical recording medium manufacturing master recording apparatus which carries out the pattern exposure by irradiating an exposure beam on a photoresist is shown in FIG. 5.

In an optical recording medium manufacturing master recording apparatus 100, there is provided a structure in which an objective lens 102 which condenses a laser beam spot and the like blinking in response to a recording signal and irradiates the same on the surface of, for example, a substrate 10 placed on a revolving base 101 is supported by using an elevator mechanism 105 consisting of a parallel plate spring and the like, and controlled in driving by a displacement driving mechanism 104 such as a voice coil motor and the like, so that the position of the objective lens 102 can be flexibly changed in a height direction of the substrate 10, that is, in a direction perpendicular to the surface of the substrate.

In the conventional optical recording medium manufacturing master recording apparatus 100, when the focus of the irradiating spot on the surface of the substrate 10 on the revolving base 101 deviates and a deviated amount of the spot is dected, this detection can be carried out by using detecting methods such as an off axis method, an astigmatism method and the like with the use of a laser beam having a different wavelength from that of the irradiated laser beam or by using a method which measures an electrostatic capacitance in a clearance between the substrate 10 and the objective lens 102.

In this case, since the revolving base 101 and the substrate 10 are controlled at high accuracy as to the degree of parallel and plane, a height adjustment of equal to or less than several $\mu$m is made possible.

However, since the master 20 is repeatedly used, when a reproducing process such as regrinding and the like is carried out after it is once used, there are produced about several tens of $\mu$m of changes in thickness when compared with an unused one.

Also, when the objective lens 102 in the conventional optical recording medium manufacturing master recording apparatus 100 is used to irradiate a recording beam on the substrate 10 to carry out an exposure, since it is necessary to form a minute condensed beam spot, the diameter of the condensed beam spot is made approximately equivalent to a wavelength of an electromagnetic wave or nearly a wavelength of the exposure beam.

In this case, it is necessary to make a numerical aperture NA of the objective lens 102 high, that is, the NA equal to nearly 0.9, and the depth of focus for maintaining the diameter of the condensed beam spot at a constant value is controlled to be equal to or less than about 0.1 $\mu$m.

In this case, the interval between the objective lens 102 and the substrate 10 is made to be equal to or more than about 100 $\mu$m.

By carrying out rough positioning of the height of the objective lens 102 by an elevator mechanism 105 which is capable of carrying out height adjustments, and thereafter, when the displacement driving mechanism 104 is driven in order to carry out, depending on necessities, a focus adjustment by the change amount in height of the substrate 10 and the revolving base 101, if a movable range by the displacement driving mechanism 104 is made equal to or less than 100 $\mu$m, it was possible to prevent the objective lens 102 from coming in contact with the master 20.

However, due to the higher recording densification of recent optical recording media, there has occurred a necessity to form a more minute pattern. As a result, the clearance between an irradiating mechanism which carries out condensation and irradiation of a beam and a substrate which is subjected to an exposure of the beam has become narrower.

That is, since the distance between the substrate and the objective lens becomes narrower, the height adjustment of the objective lens becomes fine and as a result, there has occurred a danger that the objective lens and the substrate come in contact with each other, thereby incurring a fear that the substrate and the objective lens are damaged.

SUMMARY OF THE INVENTION

Then, an object of the present invention is, in view of the above-mentioned conventional situation, in a case where the formation of the recording pattern is carried out by condensing and irradiating the beam on the substrate by the irradiating mechanism such as the objective lens and the like, to effectively avoid the contact between the substrate and the objective lens.

According to an aspect of the present invention, there is provided an optical recording medium manufacturing master recording apparatus which has such an arrangement comprising a revolving base for placing a substrate coated with a resist thereon and revolving the substrate, an irradiating mechanism for converging and irradiating a recording beam on the resist, an elevator mechanism which makes it possible for the irradiating mechanism in an opposing portion to said substrate to move in a vertical direction relative to the revolving base as well as in a surface direction which is perpendicular to the vertical direction and a height position displacement mechanism which interposes between the irradiating mechanism and the elevator mechanism, in which the irradiating mechanism is connected to the elevator mechanism through the height position displacement mechanism and at the same time, the irradiating mechanism has such a structure in which at least the converging system and the displacement driving mechanism for adjusting a focus are supported by a gas static pressure pad housing, in the gas static pressure pad housing a gas feeding pad is disposed facing a bottom surface opposing the substrate, and gas is to be fed between the irradiating mechanism and the above-mentioned master through the gas feeding pad.

According to the optical recording medium manufacturing master recording apparatus, since gas is fed between the irradiating mechanism and the master, when the distance between the irradiating mechanism and the master becomes narrower, pressure there between is raised, thereby making it possible to push up the irradiating mechanism on the surface of the substrate. As a result, the distance between the irradiating mechanism and the master can be adjusted and maintained at a desired value.

DESCRIPTION OF THE PREFERRED EMBODIMENTS

The present invention relates to an optical recording medium manufacturing master recording apparatus for manufacturing a master in order to manufacture a substrate manufacturing optical recording media such as video and audio optical recording media or optical recording media such as, for example, a compact disc (CD), a CD-ROM, a video disc, a magneto-optical disc, a mini disc (MD), a digital versatile disc (DVD) and the like.

The optical recording medium manufacturing master recording apparatus of the present invention has such an arrangement comprising a revolving base for placing a substrate coated with a resist thereon and revolving the substrate, an irradiating mechanism for condensing and irradiating a recording beam on the resist, an elevator mechanism which makes it possible for the irradiating mechanism in an opposing portion of said substrate to move in a vertical direction relative to the revolving base as well as in a surface direction which is perpendicular to the vertical direction and a height position displacement mechanism which interposes between the irradiating mechanism and the elevator mechanism, wherein the irradiating mechanism is connected to the elevator mechanism through the height position displacement mechanism and at the same time, the irradiating mechanism has a structure in which a condensing lens system and a displacement driving mechanism for adjusting a focus are at least supported by a gas static pressure pad housing, the gas static pressure pad housing consists of a gas feeding pad being disposed facing its bottom surface opposing the substrate and through the gas feeding pad, and gas is fed between the irradiating mechanism and the above-mentioned master.

Hereafter, one example of the optical recording medium manufacturing master recording apparatus of the present invention will be explained with reference to the drawings. Meanwhile, in the following example, an explanation will be made particularly, of an apparatus for manufacturing a master for manufacturing an optical recording medium by a photo-lithography which records a predetermined pattern by condensing and irradiating an exposure beam on a photoresist coated on the substrate, but the present invention is not limited to the example shown in the following and can be similarly applied to a case of forming a recording pattern by using an electron beam other than the case of forming the recording pattern by using a laser beam.

First of all, before explaining the apparatus of the present invention, a method for manufacturing the master for the optical recording medium will be explained.

Figure 1:
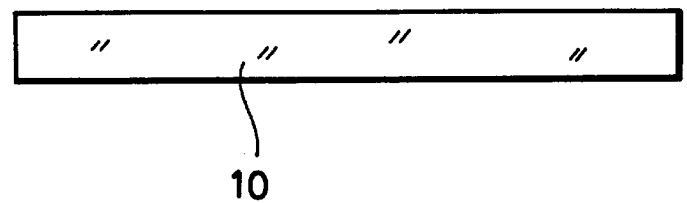
FIG. 1 is a schematic side view showing a glass substrate.
Figure 2:
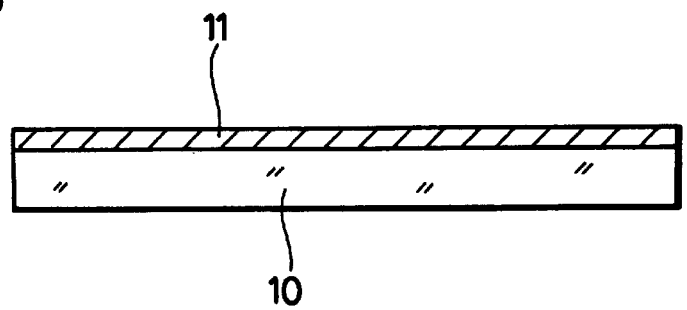
FIG. 2 is a side view showing a state of the glass substrate on which a photoresist is coated.

As is shown in FIG. 1, place, for example, a glass substrate 10 whose surface is adequately smoothly ground on a rotating base (not shown graphically), and uniformly coat thereon a photoresist 11, which is soluble in alkalis, as thick as, for example, 0.1 $\mu$m, as FIG. 2 shows, in a state of being rotated at a predetermined rotation speed.

Figure 3:
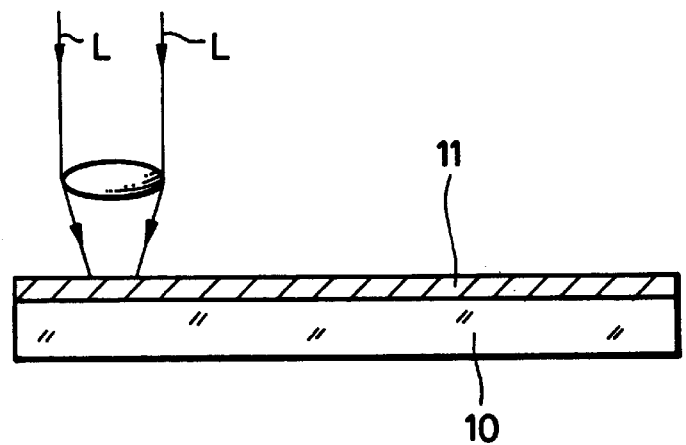
FIG. 3 is a side view showing a state in which a laser beam is condensed on the photoresist.

The photoresist 11 is, as shown in FIG. 3, exposed to a predetermined pattern by a laser beam L. The exposure is carried out by moving the laser beam L at an equal distance per one revolution in a radius direction of the glass substrate 10 while rotating the glass substrate 10 to generate a latent image of a groove on the resist 11 in a spiral state or a concentric circle state at a constant interval.

Figure 4:
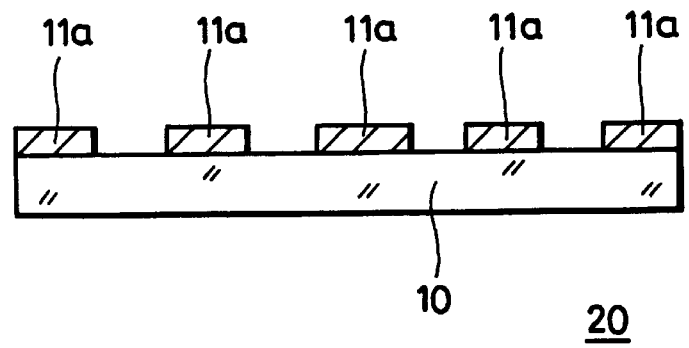
FIG. 4 is a schematic side view showing a master.
Figure 5:
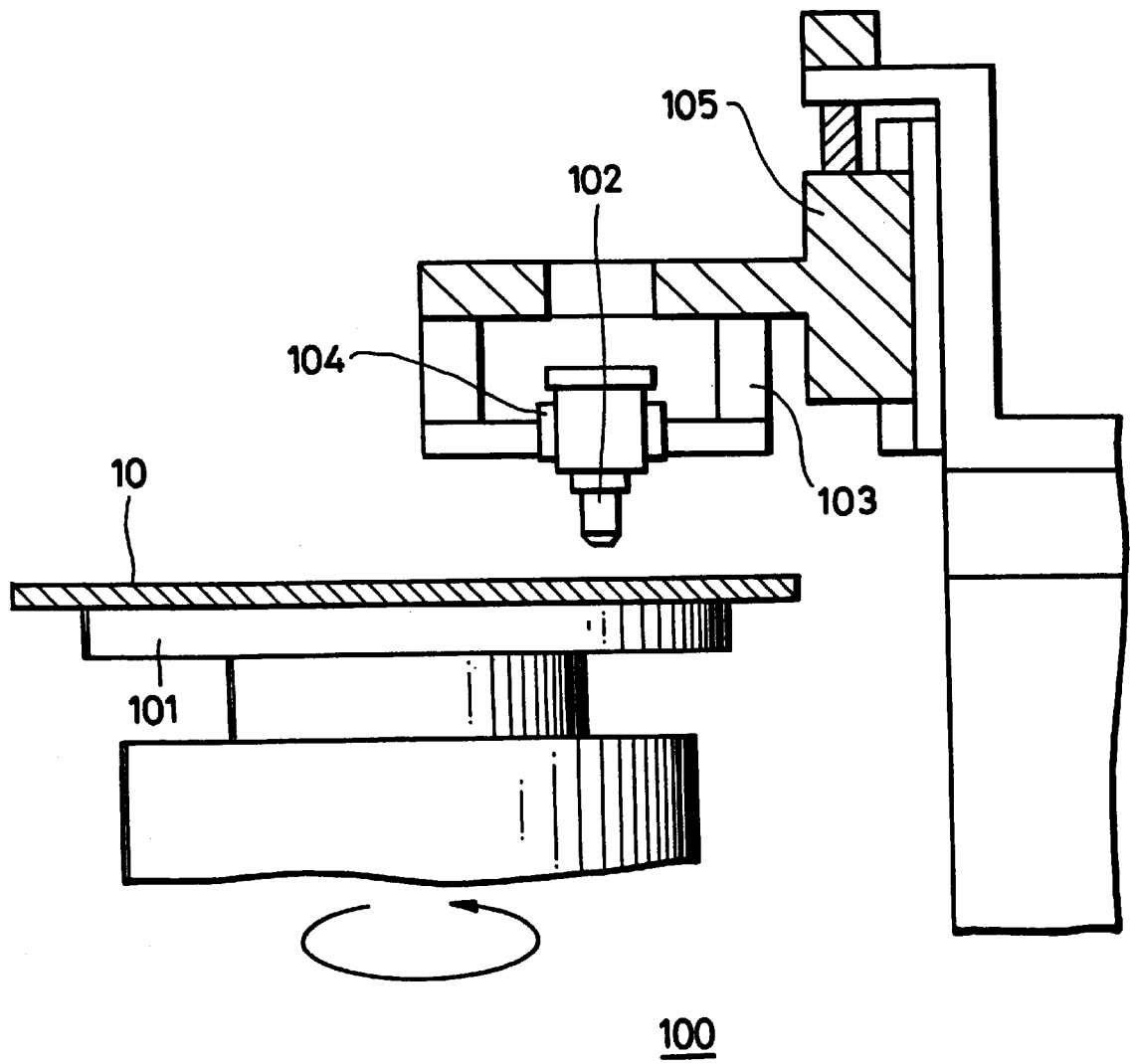
FIG. 5 is a schematic side view showing a conventional optical recording medium manufacturing master recording apparatus.

The glass substrate 10 is, as is shown in FIG. 4, developed in an alkaline developing solution and the exposed portion is removed. Being done in this manner, a master 20 for the optical recording medium, on which a predetermined pattern with minute convexes and concaves is formed can be manufactured on the glass substrate 10.

Figure 6:
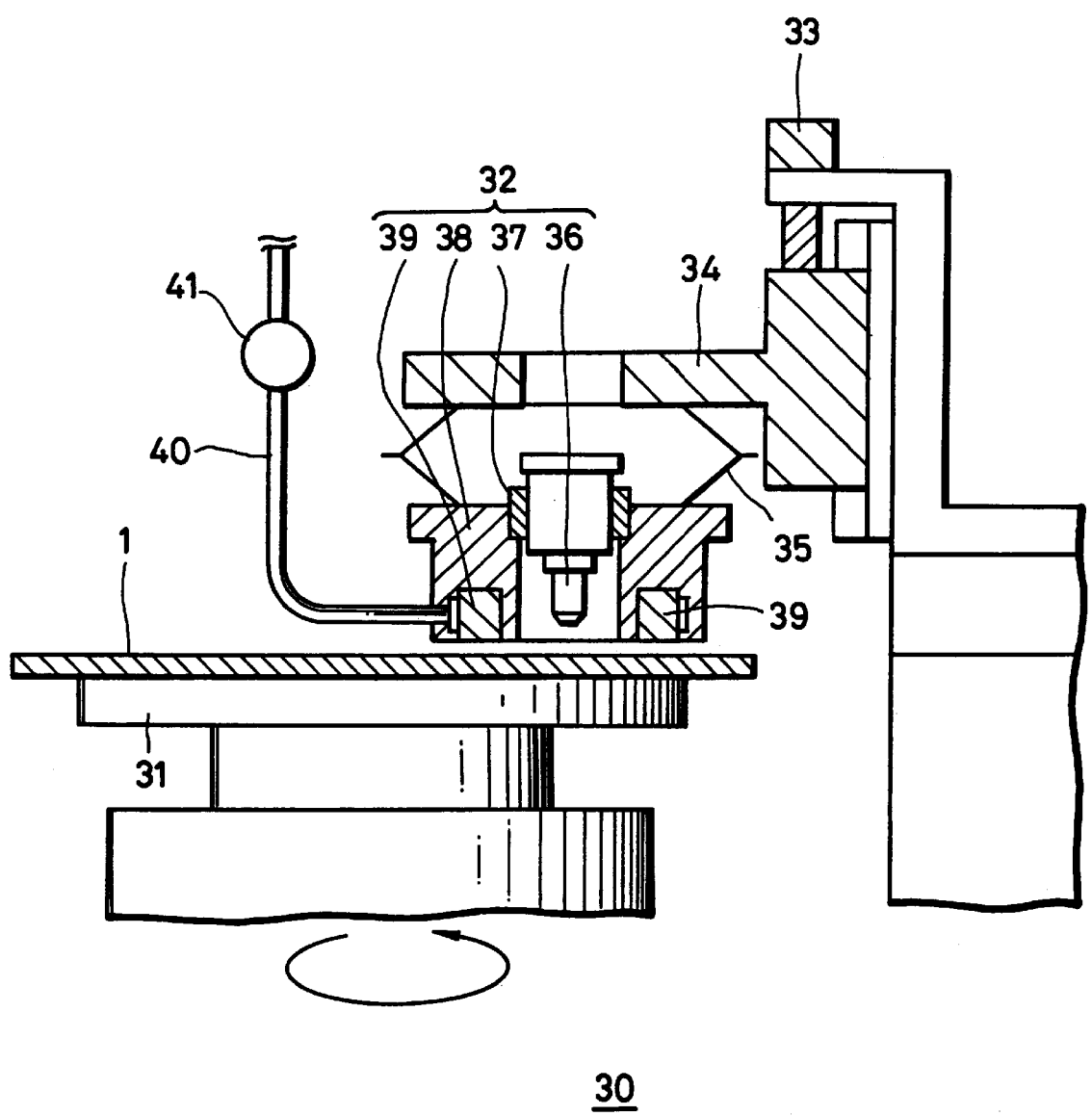
FIG. 6 is a schematic side view showing an optical recording medium manufacturing master recording apparatus according to the present invention.

FIG. 6 shows a schematic diagram of an optical recording medium manufacturing master recording apparatus 30 of the present invention, which carries out the pattern exposure of the above-mentioned master.

The optical recording medium manufacturing master recording apparatus 30 is arranged on a machine base (not shown graphically) which is excellent in: configuration and dimension stability and vibration attenuation property such as a cast iron, a native rock and the like and the machine base is so arranged to attenuate and isolate floor vibration by, for example, vibration elimination mechanism such as, for example, an air spring and the like. At that time, it is preferred that the vibration elimination mechanism, in order to restrain amplification of floor vibration in an inherent vibration area due to the number of inherent vibration and transmission thereof as well as the vibration of the base due to a vibration source on the base, uses an active vibration elimination mechanism which gives a driving force between the floor and the base to detect acceleration on the base and cancel it.

The optical recording medium manufacturing master recording apparatus 30 comprises a revolving base 31 having a function of revolving in a surface direction at a predetermined number of revolution and an irradiating mechanism 32 for irradiating a laser beam spot which blinks in response to a recording signal or the like on a surface of the substrate 1 placed on the revolving base 31.

The irradiating mechanism 32 is made to relatively scan in a surface direction of the master 1, that is, a radius direction thereof. For example, there is provided an arrangement such that the revolving base 31 on which the master 1 is placed is fixed on the machine base, and the irradiating mechanism 32 detects a radius position on the master 1 and irradiates the laser beam spot, which blinks in response to a recording signal, or the like at a desired position.

Also, the irradiating mechanism 32 is supported by an elevator mechanism 33 through an elevator movable portion 34 and disposed to oppose the master 1.

Between the irradiating mechanism 33 and the elevator movable portion 34 is disposed a height position displacement mechanism 35 of flexible structure such as, for example, a plate spring, a diagram, a bellows and the like, which can easily adjust the position of the master 1 in the height direction and as a result, fine adjustments of the distance of the irradiation mechanis 32 in a height direction relative to the master 1 is made to be carried out.

The above-mentioned irradiating mechanism 32 is comprised of an objective lens 36, a displacement driving mechanism 37 such as, for example, a voice coil motor and the like, a gas static pressure pad housing 38 and a gas feeding pad 39.

The gas static pressure pad housing 38 composing the irradiating mechanism 32 is connected to the elevator movable portion 34 through the above-mentioned height position displacement mechanism 35.

Something of a cylinder shape one made of, for example, stainless steel and aluminum can be applied to the gas static pressure pad housing 38 constructing the irradiating mechanism 32 and in an inner hollow portion of the cylinder is disposed the objective lens 36 which condenses the beam on the master.

In the gas static pressure pad housing 38 is disposed the gas feeding pad 39 of a ring shape with air permeability and pores made of, for example, ceramics and carbon to face a bottom surface of the housing opposing the substrate.

Also, the gas feeding pad 39 is connected with a gas feeding pipe 40 and through the gas feeding pipe 40 gas such as, for example, air, nitrogen and the like, which is pressure controlled by a pressure control mechanism 41 is fed to the pad and the gas is fed between the irradiating mechanism 32 and the substrate through the gas feeding pad 39.

Next, by using the optical recording medium manufacturing master recording apparatus 30 as shown in FIG. 6, a case where the exposure on the photoresist on the substrate 1 is carried out will be explained.

First of all, the gas pressure is adjusted to an extent of, for example, 5 kgF/cm$^2$ by the pressure controlling mechanism 41 and the gas is fed to the gas feeding pad 39 through the gas feeding pipe 4. Being done in this manner, since the gas feeding pad 39 is porous, the fed gas is blown in between the master 1 and the irradiating mechanism 32.

Next, by moving the elevator movable portion 34 by the elevator mechanism 33, the irradiating mechanism 32 is lowered and the distance between the irradiating mechanism 32 and the master 1 is roughly matched to a desired distance.

When the irradiating mechanism 32 is lowered in this manner, the distance between the irradiating mechanism 32 and the substrate 1 becomes narrower, and the distance is made, for example, above 30 $\mu$m–40 $\mu$m, since the gas is, as mentioned above, being blown in between the irradiating mechanism 32 and the substrate 1, the pressure between the irradiating mechanism 32 and the substrate 1 suddenly rises and a force to float the irradiating mechanism 32 in a direction departing from the surface of the substrate begins to act.

In this case, since it is possible to make higher the pressure between the substrate 1 and the irradiating mechanism 32 as the distance between the substrate 1 and the irradiating mechanism 32 becomes narrower, even in a case where the irradiating mechanism 32 is much too lowered by the elevator mechanism 33, because a force to float the irradiating mechanism 32, which is decided by the pressure between the substrate 1 and the irradiating mechanism 32 as well as an area of a surface of the irradiating mechanism 32 opposing the substrate 1, works, the height position displacement mechanism 35 consisting of such as, for examples a plate spring, a diagram, a bellows and the like works and finally, the irradiating mechanism 32 comes to a standstill at a position where a force working on the irradiating mechanism 32 in a downward direction on the substrate 1 and the force of an upward direction by the above-mentioned floating force working in an opposite direction to the substrate 1 strike a balance, thereby making it possible to keep the distance between the substrate 1 and the irradiating mechanism 32 at a constant value.

Meanwhile, the distance between the irradiating mechanism 32 and the substrate 1 can be adjusted to a desired value by adjusting the gas pressure to be supplied by the pressure control mechanism 41.

Next, the objective lens 36 is subjected to a fine adjustment by the displacement driving mechanism 37 such that its focus is to be accurately set on the substrate 1.

That is, if there is unevenness in thickness on the substrate 1, when the revolving base 31 is revolved, there occurs a fluctuation in relative height of the substrate 1 depending on the position at which the beam is irradiated. In the case like this, by a focusing point deviation detecting method such as an astigmatism method by a reflected returning light from the substrate 1 or a reflected returning light of detecting light beam with different wavelengths, a knife-edge method, an off-axis method and the like, alternatively an interval detecting method by electrostatic capacitance between a tip end portion of the objective lens and the surface of the substrate 1 and a tunnel current, positional fluctuations of the objective lens from the focusing point is detected, and in order to cancel the amount of deviation due to the fluctuations, the displacement driving mechanism 37 is drive-controlled so that a focusing state is achieved and maintained.

At this time, when a moving adjusting range of the objective lens 36 by the displacement driving mechanism 37 limited to a desired value by way of electrical or mechanical means to be equal to or less than the distance between the tip end portion of the objective lens 36 and the substrate 1 in a focusing state, it is possible to avoide that the substrate 1 and the objective lens come into contact with each other and that the damage is caused by the contact.

As mentioned above, after the focusing position of the exposure beam on the substrate 1 is controlled, the glass substrate 10 is, as explained by using FIG. 1 to FIG. 4, developed in the alkaline developing liquid and the exposure portion is removed. By being done in this manner, the master 20 for the optical recording medium, on which a predetermined fine convexes and concaves pattern 11a is formed, can be obtained.

Next, another example of the optical recording medium manufacturing master recording apparatus will be explained with reference to FIG. 7.

Figure 7:
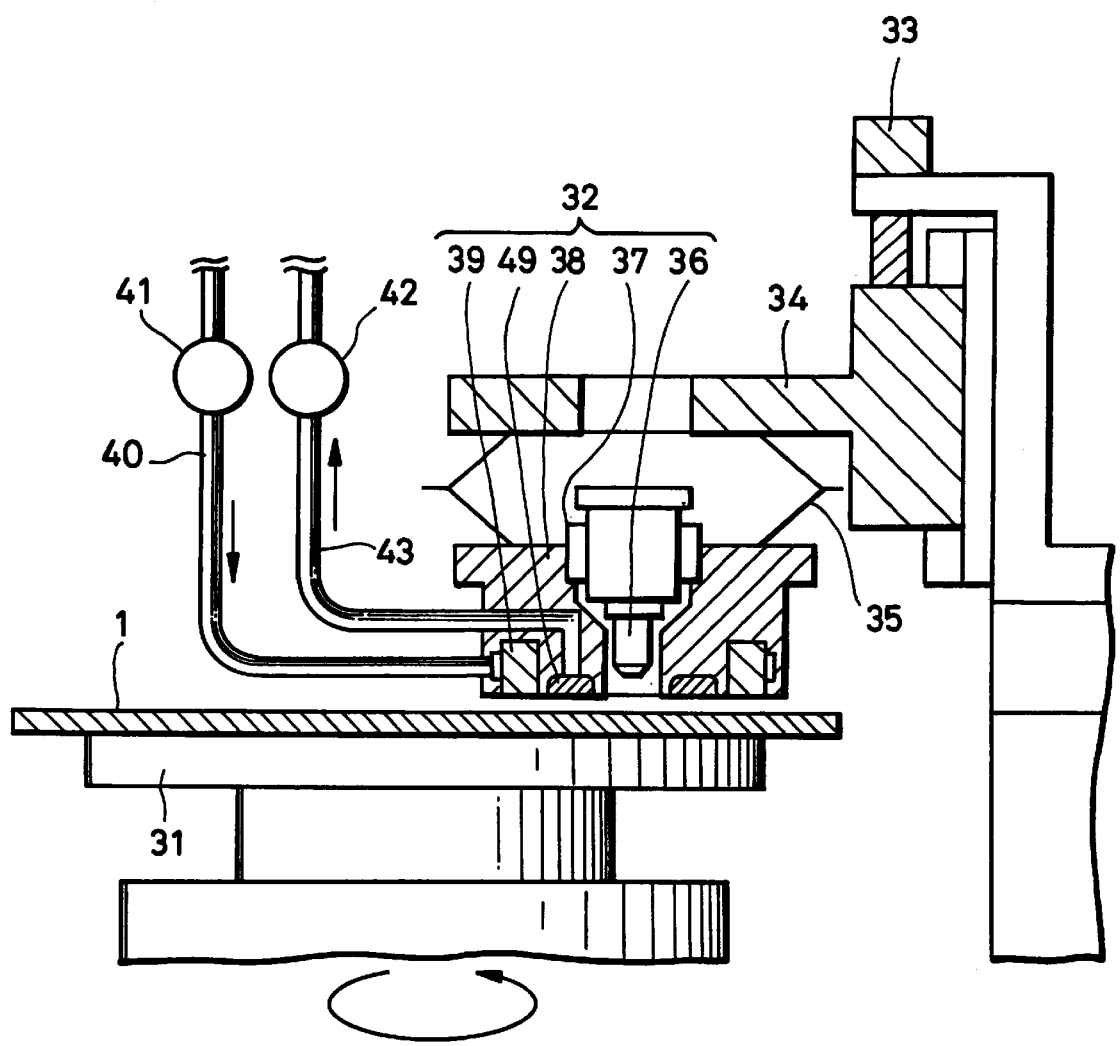
FIG. 7 is a schematic side view showing another example of the optical recording medium manufacturing master recording apparatus according to the present invention.

In an optical recording medium manufacturing master recording apparatus 60 shown in FIG. 7, as for portions in common in terms of the arrangement with the optical recording medium manufacturing master recording apparatus 30 shown in FIG. 6, repetitive explanations will be omitted by attaching the same reference numerals.

The optical recording medium manufacturing master recording apparatus 60 shown in FIG. 7 is such that in the gas static pressure pad housing 38, in addition to the gas feeding pad 39, for example, a ring-shaped gas absorbing pad 49 is provided facing the bottom surface of the gas static pressure pad housing. The gas absorbing pad 49 is disposed with its bottom surface opposing the substrate 1.

Also, the gas absorbing pad 49 is connected with a gas absorbing pipe 43 and its pressure is controlled by a pressure control mechanism 42 through the gas absorbing pipe 43 to thereby absorb the gas which exists between the substrate 1 and the irradiating mechanism 32.

In this manner, by not only sending the gas through the gas feeding pad 39 between the irradiation mechanism 32 and the substrate 1 but also making it possible for the gas absorbing pad 49 to absorb the gas between the irradiating mechanism 32 and the substrate 1, it becomes possible to carry out a further precision adjustment of the distance between the irradiating mechanism 32 and the substrate 1.

That is, since an absorbing force which is decided by multiplying a negative pressure due to the absorption of the gas between the irradiating mechanism 32 and the substrate 1 by a negative pressure region area works in addition to a force to push the irradiation mechanism in a direction toward the substrate 1 by the weight of the irradiating mechanism 32 and the height position displacement mechanism 35, the distance between the irradiating mechanism 32 and the substrate i can be made further narrower.

Meanwhile, when the distance between the irradiating mechanism 32 and the substrate 1 becomes equal to or less than about 20 μm, it has been ascertained that floating rigidity rapidly improves and as a result, the spring constant of the height position displacement mechanism 35 increases. Therefore, it becomes possible to make the number of the inherent vibration (resonance vibration) of the floating irradiation mechanism 32 a high frequency. As a result, it becomes possible to improve a following precision of the floating height of the irradiating mechanism 32 relative to the fluctuation in height due to the unevenness in thickness on the surface of the substrate 1.

According to the optical recording medium manufacturing master recording apparatus of the present invention, at the time of forming the recording pattern, the distance between the substrate and the irradiating mechanism can be kept substantially constant. As a result, in a case where the focus depth is large, it becomes unnecessary to adjust the position of the lens by the displacement driving mechanism. Further, even in a case where the focus depth is shallow, the moving range of the displacement driving mechanism has been able to be reduced by a large margin, thereby making it possible to obtain a stable control characteristic.

Also, according to the optical recording medium manufacturing master recording apparatus of the present invention, at the time of forming the recording pattern, since it has become possible to avoid the substrate coming in contact with the irradiating mechanism, the damage due to the contact can be prevented.

Also, with the distance between the irradiating mechanism and the substrate being made to be adjusted by blowing out the gas to the gas static pressure pad and absorbing the gas therefrom, since it is possible to remove the trash and dust auxiliarily attached on the surface of the substrate by blowing off or absorbing, it becomes possible to keep clean the surface of the substrate on which the recording beam is irradiated, as well as to implement a reduction in signal deficiencies.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

I claim:

1. An optical recording medium manufacturing master recording apparatus comprising:
 a revolving base on which a substrate coated with a resist thereon is placed and which revolves said substrate,
 an irradiating mechanism for converging and irradiating a recording light beam or a recording electron beam on said resist,
 an elevator mechanism configured to move said irradiating mechanism in an opposing portion of said substrate in a vertical direction relative to said revolving base and in a surface direction which is perpendicular to the vertical direction, and
 a height position displacement mechanism which interposes between said irradiating mechanism and said elevator mechanism,
wherein:
 said irradiating mechanism is connected to said elevator mechanism through said height position displacement mechanism, said irradiating mechanism has such a structure in which at least a converging lens system and a displacement driving mechanism for adjusting a focus of the recording beam are supported by a gas static pressure pad housing, in said gas static pressure pad housing, a gas feeding pad is disposed facing a bottom surface opposing said substrate, and p1 gas is fed between said irradiating mechanism and said substrate through said gas feeding pad.

2. An optical recording medium manufacturing master recording apparatus as claimed in claim 1, wherein:

a gas absorbing pad is provided facing said bottom surface of the gas static pressure pad housing composing said irradiating mechanism, and gas between said irradiating mechanism and said substrate is made to be absorbed through said gas absorbing pad.

* * * * *

UNITED STATES PATENT AND TRADEMARK OFFICE
CERTIFICATE OF CORRECTION

PATENT NO.   : 6,438,074 B1
DATED        : August 20, 2002
INVENTOR(S)  : Yuichi Aki et al.

It is certified that error appears in the above-identified patent and that said Letters Patent is hereby corrected as shown below:

Column 9,
Line 8, delete "p1"

Signed and Sealed this

Eighth Day of April, 2003

JAMES E. ROGAN
*Director of the United States Patent and Trademark Office*